(12) United States Patent
Nagata et al.

(10) Patent No.: US 8,821,297 B1
(45) Date of Patent: Sep. 2, 2014

(54) NON-TRANSITORY COMPUTER-READABLE STORAGE MEDIUM STORING GAME PROGRAM, METHOD, AND SERVER DEVICE

(71) Applicant: DeNA Co., Ltd., Tokyo (JP)

(72) Inventors: Itchito Nagata, Tokyo (JP); Rina Washino, Tokyo (JP); Yosaku Toyama, Tokyo (JP); Hiroki Yoshifuji, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/166,665

(22) Filed: Jan. 28, 2014

(30) Foreign Application Priority Data

May 2, 2013 (JP) ................................ 2013-097183

(51) Int. Cl.
*A63F 13/00* (2014.01)
(52) U.S. Cl.
USPC .................................. 463/42; 463/1; 463/29
(58) Field of Classification Search
USPC ...................................................... 463/20–42
See application file for complete search history.

(56) References Cited

U.S. PATENT DOCUMENTS

| | | | | |
|---|---|---|---|---|
| 6,699,125 B2 * | 3/2004 | Kirmse et al. | ................... | 463/42 |
| 7,278,921 B1 | 10/2007 | Fujisawa et al. | | |
| 8,663,011 B2 * | 3/2014 | Kirmse et al. | ................... | 463/42 |
| 8,689,273 B2 * | 4/2014 | Reisman | ........................ | 725/133 |
| 2005/0027382 A1 * | 2/2005 | Kirmse et al. | ................... | 700/91 |
| 2007/0218997 A1 * | 9/2007 | Cho | ................................. | 463/42 |
| 2008/0300045 A1 * | 12/2008 | Ratcliff | ........................... | 463/25 |
| 2009/0253516 A1 * | 10/2009 | Hartmann et al. | .............. | 463/42 |
| 2012/0214564 A1 * | 8/2012 | Barclay et al. | .................. | 463/11 |
| 2012/0278830 A1 | 11/2012 | Khoshgozaran et al. | | |

FOREIGN PATENT DOCUMENTS

| | | |
|---|---|---|
| JP | 2002-288101 | 10/2002 |
| JP | 2003-186816 | 7/2003 |
| JP | 2002-325965 A1 | 3/2004 |
| JP | 2004-089584 | 3/2004 |
| JP | 2004-329914 | 11/2004 |
| JP | 2006-223893 | 8/2006 |
| JP | 2009-018201 | 1/2009 |
| JP | 2011-005048 A1 | 1/2011 |
| JP | 2011-115472 | 6/2011 |
| JP | 2012-011209 | 1/2012 |
| WO | WO01-027771 | 4/2001 |

OTHER PUBLICATIONS

Japanese Patent Application No. 2013-097183 Office Action mailed on May 29, 2013.

(Continued)

*Primary Examiner* — Masud Ahmed
(74) *Attorney, Agent, or Firm* — Procopio, Cory, Hargreaves & Savitch LLP

(57) ABSTRACT

A server device receives a request to start a game playable on the chat from the terminal of a chat participating user, asks other chat participating users participating in the chat for their wish to participate in the game requested to start, accepts participation of a chat participating user responding to the inquiry about the participation as a game participating user, and starts the game on the chat. The server device receives an instruction for a progress of the game from the terminal of a game participating user, and displays an image corresponding to the received instruction on the chat screen.

8 Claims, 10 Drawing Sheets

(56) References Cited

OTHER PUBLICATIONS

Japanese Patent Application No. 2013-097183: Office Action mailed on Aug. 13, 2013.
Japanese Patent Application No. 2013-230717: Office Action mailed on Mar. 4, 2014.
You can make new friends by creating your avatar and progressing quiz games! Free chatting app "COCO" is released, press release issued by cocone corporation, cocone corporation, Aug. 16, 2012.
Mamiruton, Free calls-comm More quickly, in higher quality.: Comfortable free call is available! For free., AppBank, Oct. 23, 2012, [online], <search date: Feb. 27, 2014>, See the photograph below the article "Comm's stickers are cute like docomo's one!". URL, http://www.appbank.net/2012/10/23/iphone-application/494782.php.
Japanese Patent Application No. 2013-230717 Office Action mailed on Jun. 3, 2014.

* cited by examiner

NON-TRANSITORY COMPUTER-READABLE STORAGE MEDIUM STORING GAME PROGRAM, METHOD, AND SERVER DEVICE

BACKGROUND OF THE INVENTION

1. Field of the Invention

The present invention relates to a social communication technique using information communication terminals.

2. Description of Related Art

There is conventionally provided a service, so-called chat, for making real-time character communication by use of information processing devices such as PC (Personal Computer) terminals or portable terminals. Exemplary forms of the chat service include user-to-user chat on one-to-one basis, in-group chat by a plurality of users belonging to a specific group, inter-group chat, and the like. The chat is performed between members entering a virtual room called chat room.

On the other hand, multifunctional portable terminals called Smartphone have been rapidly spread since 2010, and many chat services which are assumed to be used in portable terminals are provided and users are increasing.

In such a situation, network-type games in which a plurality of users participate via a network are spreading. There is provided a network game in which information processing devices such as PC terminals or portable terminals are used to communicate with a game server, thereby mutually exchanging information for communication (see Japanese Patent Application Laid-Open Nos. 2003-186816, 2006-223893, 2011-115472, and 2012-011209, for example).

SUMMARY OF THE INVENTION

However, there is provided an environment in which participants in a game have a chat during the game, but there is not present an environment in which a game is played during a chat.

For example, if a member wants to start playing cards or mah-jongg with other members during a chat by a plurality of users in a chat room, a browser or game application for the game needs to be started up.

Thus, complicated operations for starting the game are required for the users, and the chat members have to come together again on the game application. Therefore, an excitement that chat members want to play a game soon fades, and an interest in the game disappears soon.

The present invention has been made in terms of the above problems, and an object thereof is to provide a non-transitory computer-readable storage medium storing game program, a method and a server device by which chat members can play a game during a chat.

An aspect of the present invention relates to a non-transitory computer-readable storage medium storing game program executed by a computer. The non-transitory computer-readable storage medium storing game program includes a participation acceptance step of accepting participation in a predetermined chat from a user terminal via a communication line, a user instruction reception step of receiving a chat message from the terminal of a chat participating user whose participation in the chat is accepted, a screen display control step of displaying the received chat message on the chat screen of the terminal of a chat participating user, and a game control step of receiving a request of starting a game playable on the chat and asking other chat participating users participating in the chat for their wish to participate in the game requested to start. The participation acceptance step accepts participation of a chat participating user responding to the inquiry about the participation in the game control step as a game participating user.

According to the aspect, a request of starting a game playable on the chat is received from the terminal of a chat participating user, and an inquiry about participation in the game for the start request is made so that the chat members can immediately start the game.

The user instruction reception step receives an instruction for a progress of the game from the terminal of a game participating user. The screen display control step displays an image corresponding to the instruction received in the user instruction reception step on the chat screen.

According to the aspect, an image corresponding to the instruction received in the user instruction reception step is displayed on the chat screen so that the game can be played as an extension of the chat or the game can be played while the chat is being held.

The user instruction reception step may receive a chat message from the terminal of a chat participating user other than the game participating users also during the game. The screen display control step may display a chat message from the terminal of a chat participating user other than the game participating users and a progress of the game on the chat screen of the terminal of the chat participating user other than the game participating users.

According to the aspect, a chat message from the terminal of the chat participating user other than the game participating users and a progress of the game are displayed on the chat screen of the terminal of the chat participating user other than the game participating user, so that the chat participating user not participating in the game can view the game, does not feel isolated also after the game is started, and can continuously enjoy the chat with a sense of togetherness.

The instructions for a progress of the game received in the user instruction reception step may include selection of an item give to a game participating user, use of an item, or permission/non-permission to exercise an authority given according to a progress of the game.

According to the aspect, an instruction of selecting an item, using an item or permitting/non-permitting to exercise an authority given according to a progress of the game is received so that the user interface of the chat can be efficiently utilized for the game.

The screen display control step displays a button image for exercising an authority given according to a progress of the game on the chat screen of a game participating user given the authority and the game participating user designates the button image so that the instruction for a progress of the game may be received in the user instruction reception step.

According to the aspect, a button image for exercising an authority given according to a progress of the game is displayed on the chat screen of a game participating user given the authority and the game participating user designates the button image so that the instruction for a progress of the game is received in the user instruction reception step, thereby making the user's input processing during the game efficient and enhancing an interest in the game.

The user instruction reception step may receive a chat message from the terminal of a game participating user, analyze the chat message and convert it into an instruction for a progress of the game.

According to the aspect, a chat message is received from the terminal of a game participating user and the chat message is analyzed and converted into an instruction for a progress of the game so that various types of input can be provided to the user, thereby making the user's input processing during the game efficient and enhancing an interest in the game.

The screen display control step may display a promotion of the progress on the chat screen or make a push notification in order to promote the game participating users to progress the game.

According to the aspect, a promotion of the progress is displayed on the chat or a push notification is made in order to promote the game participating users to progress the game so that the game participating user concentrating on the chat can be promoted to progress the game, thereby enhancing an interest in the game.

Another aspect of the present invention is a method. The method includes a participation acceptance step of accepting participation in a predetermined chat from a user terminal via a communication line, a user instruction reception step of receiving a chat message from the terminal of a chat participating user whose participation in the chat is accepted, a screen display control step of displaying the received chat message on the screen of the terminal of a chat participating user, and a game control step of receiving a request of starting a game playable on the chat from the terminal of a chat participating user and asking other chat participating users participating in the chat for their wish to participate in the game requested to start. The participation acceptance step accepts participation of a chat participating user responding to the inquiry about the participation in the game control step as a game participating user. The user instruction reception step receives an instruction for a progress of the game from the terminal of a game participating user. The screen display control step displays an image corresponding to the instruction received in the user instruction reception step on the chat screen.

Another aspect of the present invention is a server device. The server device includes a participation acceptance unit configured to accept participation in a predetermined chat from a user terminal via a communication line, a user instruction reception unit configured to receive a chat message from the terminal of a chat participating user whose participation in the chat is accepted, a screen display control unit configured to display the received chat message on the screen of the terminal of a chat participating user, and a game control unit configured to receive a request of starting a game playable on the chat and asking other chat participating users for their wish to participate in the game requested to start. The participation acceptance unit accepts participation of a chat participating user responding to the inquiry about the participation in the game control unit as a game participating user. The user instruction reception unit receives an instruction for a progress of the game from the terminal of a game participating user. The screen display control unit displays an image corresponding to the instruction received in the user instruction reception step on the chat screen.

Any combinations of the above constituents, and expressions of the present invention converted in method, device, system and computer program are also effective as forms of the present invention.

According to the present invention, a game can be immediately started between chat members during a chat.

DETAILED DESCRIPTION OF THE INVENTION

Figure 1:
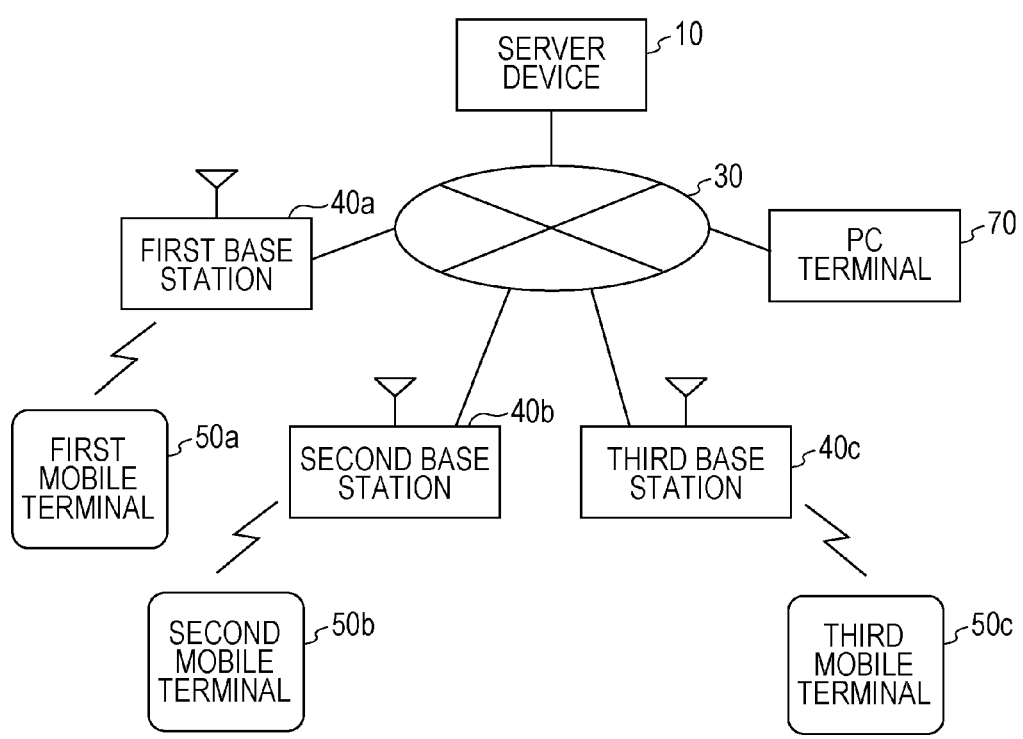
FIG. 1 is a diagram illustrating an exemplary structure of a chat system according to a first embodiment.

An outline of the present invention will be first described before explaining an embodiment of the present invention. The present invention relates to a technique for providing a game play environment for chat members in a chat system by a plurality of users via a network.

In a conventional chat system, if a member wants to play cards or mah-jongg with other participating members during a chat by a plurality of users in a chat room, the chat has to be interrupted and a game application needs to be additionally started up. Further, the members who gathered for the chat have to gather again on the game application.

In such a form, complicated operations for starting the game are required for the users, and thus an excitement that chat members want to play a game soon fades, and an interest in the game disappears soon. A chat member who does not participate in the game does not know a game progress, and feels isolated.

In the present invention, the above problems are eliminated, and game participants gather during the chat and the chat and the game can be present on one chat screen. In such a form, a game progress can be grasped whether a user participates in the game or not, and thus an interest in the chat can be further enhanced.

A table game such as cards or mah-jongg is suitable for a game played in the chat system (which will be called in-chat game below) according to the present invention. Such a table game is suitable because a game progress (powerful card or tile of trump cards or mah-jongg tiles) and chat messages can be displayed together on the chat screen. Such a form enables a game progress to be provided in a timely manner to game participants and a member who does not participate in the game but participates in the chat (which will be called spectator below). An example in which the present invention is applied to "poker" will be described below.

A social game will be briefly described herein. The social game is application game software which uses a platform such as API (Application Programming Interface) operating on a web browser typically using SNS information and operates based thereon. It will be simply called browser game below.

The social game uses SNS information, and an application program is downloaded to each user-operating terminal device, the application program is executed in each terminal device, and various parameters are exchanged between each terminal device and a server device. It will be simply called app game below.

The following processings as examples of the present invention may be performed in the server device providing games as browser games or may be performed as an app game in a program executed on a terminal device side. The examples described below are applicable to card games such as "Poverty" other than "poker" and table games such as mah-jongg. The following description is for understanding of the present invention, and a technical scope of the present invention is not limited thereto.

First Embodiment

A first embodiment will be first described. FIG. 1 is a diagram illustrating a chat system 100 according to the first embodiment of the present invention. The chat system 100 includes a server device 10, a network 30 for connecting the server device 10 and base stations 40 via a line, first base station 40a to third base station 40c collectively denoted as base station 40, first mobile terminal 50a to third mobile terminal 50c collectively denoted as mobile terminal 50, and a PC terminal 70.

Only three base stations 40 and three mobile terminals 50 are illustrated for convenience of illustration, but, not limited thereto, more base stations 40 and mobile stations 50 may be present, This is applicable to the PC terminal 70. The first mobile terminal 50a to third mobile terminal 50c are illustrated as connected to the different base stations 40, respectively, but, not limited thereto, a plurality of mobile terminals 50 may be connected to one base station 40, which is within the scope of the present invention.

The server device 10 is a device for performing and providing chat services and in-chat games. The server device 10 performs a communication processing required to provide a chat service or game service with the mobile terminals 50 or the PC terminals 70 via the network 30 and the base stations 40.

The expression "a communication processing is performed between the server device 10 and the mobile terminals 50 or the PC terminals 70" is simply used in the following for simplified description, and the use of the network 30 and the base stations 40 will be omitted. In the following, the mobile terminals 50 or the PC terminals 70 may be collectively expressed as user terminal. The server device 10 may be a platform for providing services for network games or may be a server for providing network game applications.

An explanation will be made below assuming that the server device 10 mainly performs a participation processing or game control in an in-chat game, but, not limited thereto, the functions are distributed among other devices such as user terminals and mutually cooperates therewith, thereby achieving the present invention.

The server device 10 downloads an app in response to a request from a user terminal. Then, contact information stored in the memory of the user terminal is uploaded and imported to the memory of the server device 10 so that the user can start using the chat service.

Herein, the server device 10 has a chat function of providing a chat service between the users entering a predetermined chat room, a game control function of providing an in-chat game, a friend suggestion function of suggesting a friend in the chat system, a friend list management function of managing a list of friends, a search function of searching a friend or searching a chat party, and an e-mail integration function of having a chat with a chat party.

The chat function causes a user executing an app for using the chat system to select a predetermined chat room, thereby promoting the user to enter the room. After the entrance into the room, chat messages can be exchanged between the chat participating users in the chat room. Specifically, chat messages notified from the user terminal of a chat participating user in the chat room are displayed on the chat screens of the user terminals of other chat participating users.

A chat participating user selects a game which he/she wants to play after the chat is started so that the game control function starts providing the game service. After the game is started, at first, a push notification for calling for participation or chat messages are displayed on the chat screen of each user terminal of a chat participating user. The chat function continues also during the game.

An image of a card or the like is displayed together with an avatar image of a game participant on the chat screen according to a progress of the game. Chat messages from the game participants or game spectators may be displayed on the chat screen.

The friend suggestion function has a function of introducing and suggesting a user to be registered in a friend list (which will be called "suggest function" below). Thought described later in detail, the suggest function determines other user to be suggested to the registered users. The friend list management function has a function of registering a user selected by the registered user from the suggested users in the friend list. The search function searches user information stored in the server device 10, and displays one or more items of searched user information on the user terminal in a predetermined order. The user information contains registered user ID, belonging group ID, past chat party's user ID, SNS ID, and the like.

The e-mail integration function is directed for having a chat with a desired user without causing the user to consider whether the chat party is a registered user. The server device 10 determines a communication system to the party of the chat service in response to a request of starting the chat service from the user terminal. Specifically, an optimum communication system is determined based on registration information stored in the memory of the server device 10 according to priority information of the communication system, and a message transmitted from the user terminal is converted into a communication system therefor, for example an E-mail form to be transmitted to the party.

A chat system is selected in principle for a communication system applied in communication to the transmission destination when the transmission destination is a registered user. On the other hand, when the transmission destination is an unregistered user, a system according to information on the unregistered user registered in the memory is selected. Its details will be described later. With such a form, even if the party is an unregistered user, the user can have a chat without considering the fact.

When using the chat service, the user terminal first accesses the server device 10, downloads and installs an app. Then, it uploads contact information registered in its terminal in response to a request from the server device 10. Thereafter, when the chat service is used, the app is started up, a friend registered in the friend list or a user searched by the search function is designated as a transmission destination and a message to the transmission destination may be created and transmitted. As described above, the user of the user terminal is not concerned with whether the transmission destination user is an unregistered user or not on using the chat system 100.

When wishing to start a game with members in the chat room while the chat is being held, the user of the user terminal selects a game to be played. Thereafter, a notification to ask for participation is transmitted to other users in the chat members. When a response for participation is made to the notification within a predetermined period, he/she can participate in the game. If the maximum number of participants of the selected game is exceeded even within the predetermined period, he/she cannot participate in the game. The user who does not participate in the game can confirm a progress of the game as a game spectator on the chat screen. The user who does not participate in the game can notify a chat message to the game participants according to a progress of the game, and thus all the members in the chat room can enjoy the game and chat.

Figure 2:
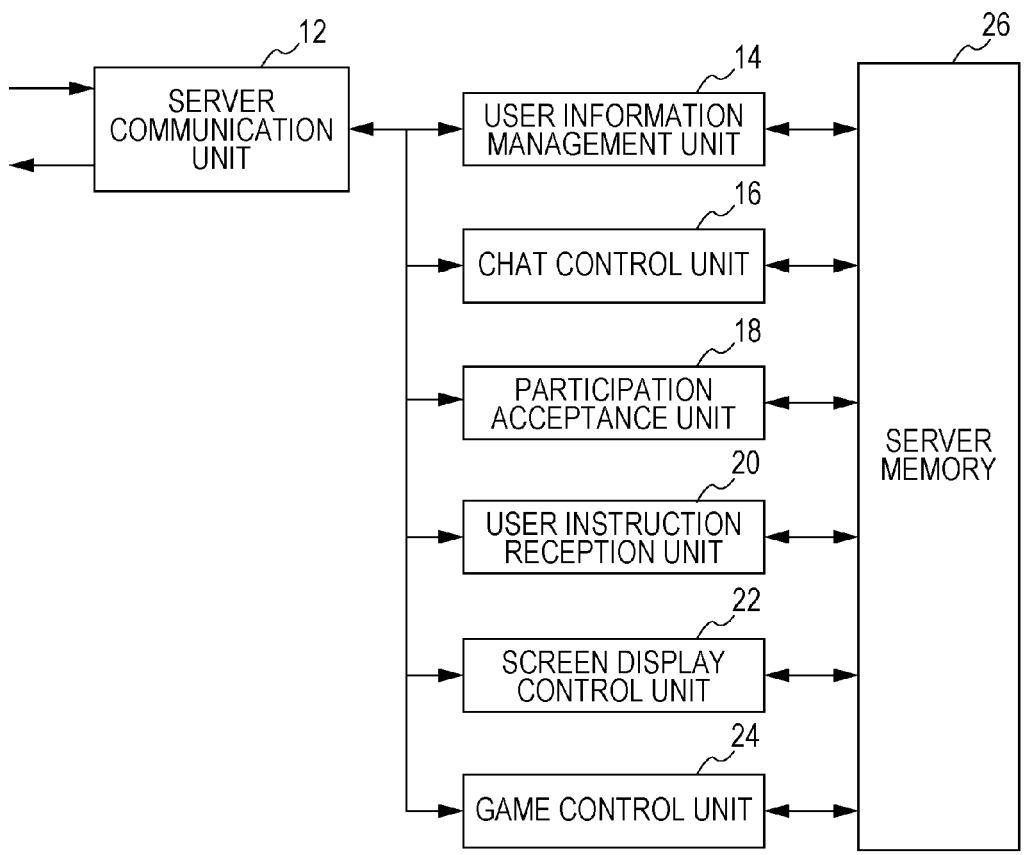
FIG. 2 is a diagram illustrating an exemplary structure of a server device of FIG. 1.

FIG. 2 is a diagram illustrating an exemplary structure of the server device 10 in the chat system 100 of FIG. 1. The server device 10 includes a server communication unit 12, a user information management unit 14, a chat control unit 16, a participation acceptance unit 18, a user instruction reception unit 20, a screen display control unit 22, a game control unit 24 and a server memory 26.

The server communication unit 12 receives a signal from a user terminal, performs a predetermined demodulation processing thereon, and transmits the demodulated signal to the user information management unit 14, the participation acceptance unit 18, the chat control unit 16, the user instruction reception unit 20, the screen display control unit 22 and the game control unit 24.

The server communication unit 12 transmits predetermined data to the user terminal in a communication system selected in the chat control unit 16. The predetermined data may be an instruction of displaying a chat message transmitted from the user terminal by the chat control unit 16 on the chat screens of the user terminals of other chat members, or image information such as a chat screen or avatar image, or text information of the chat messages.

The server communication unit 12 acquires a friend list or suggest list stored in the server memory 26 via the chat control unit 16 at a predetermined timing, and transmits it to the user terminals of the users associated with the list.

The modulation/demodulation processing in the server communication unit 12 may employ a conventionally-used modulation/demodulation technique, and those skilled in the art can of course understand that the present invention is applied to such a form.

The user information management unit 14 manages information on the users registered in the chat system 100 in the server memory 26. The user information contains user identification information, user name, avatar image information, and user-input comments. The user information may be referred to by the chat control unit 16 or the game control unit 24 and may be displayed on the chat screen.

The server memory 26 may manage information on in-chat games provided in the chat system 100 in addition to the user information. The information on in-chat games may be game play history, score information, opponents, past play record, and the like.

The chat control unit 16 receives a signal from the server communication unit 12, performs a processing depending on its contents, accesses the server memory 26, and instructs the server communication unit 12 to transmit. The signal received from the server communication unit 12 is a signal from the user terminal such as a request of downloading an app for using the chat service (which will be called chat app below), information uploaded from the user terminal, selection of a chat party or user to be registered as friend, and a message to the transmission destination.

The chat control unit 16 reads the chat app for causing the user to download it, imports contact information transmitted from the user terminal, or accesses information for determining a communication system for the server memory 26. The chat control unit 16 causes the user terminal to download an app in response to a request form the user terminal. After the download into the user terminal, the chat control unit 16 asks the user terminal for whether to import the contact information stored in the user terminal to the server device 10. If import is permitted, the contact information is transmitted from the user terminal and the chat control unit 16 writes the information in the server memory 26.

The chat control unit 16 has the friend suggestion function, and determines other user to be suggested to the registered users as a friend candidate under a predetermined condition set depending on the registration to the chat service, and registers him/her in the suggest list in the server memory 26. The predetermined condition set according to registration to the chat service is different between when a user to be suggested is a registered user and when he/she is an unregistered user. The condition is for estimating a degree of friendship with the user to be suggested.

The chat control unit 16 has the friend list management function, and registers a user selected from the registered user terminals, which is received via the server communication unit 12, among the users registered in the suggest list as friend candidates into the friend list in the server memory 26. The friend list is managed per registered user in the server memory 26.

The chat control unit 16 has the search function, and when a request is not made from the user terminal of a registered user, searches one or more users to be displayed from among the users contained in the suggest list of the registered users stored in the server memory 26. A searched user is displayed on the user terminal as friend candidate.

When a plurality of users are searched, a display order is determined by a predetermined algorithm and is displayed on the chat screen of the user terminal. That is, the user terminal displays thereon a list of friend candidates as "may be friend." The search timing and the display timing may be when the chat service app is started up or at certain intervals after the startup. Thereby, the user is given a chance to increase friends.

The chat control unit 16 receives a request of searching a real name from the user terminal of a registered user via the server communication unit 12, acquires the real name to be searched, and searches all the user information stored in the server memory 26 for the real name. The searching may employ a conventional search technique such as front-part match or partial match.

When a plurality of users are searched, a display order thereof is determined by a predetermined algorithm determined depending on a degree of friendship with the registered users, transmitted via the server communication unit 12, and displayed on the chat screen of the user terminal. The suggest list is managed per registered user in the server memory 26.

When determining a communication system to the transmission destination, the chat control unit 16 selects one communication system according to the information on the priority of the communication system to be applied from among one or more communication systems registered in the server memory 26 for the transmission destination.

The participation acceptance unit 18 accepts participation in a predetermined chat from the user terminal via the server communication unit 12. The participation acceptance unit 18 accepts participation of a chat participating user who responds to the inquiry about the participation by the game control unit 24 as a game participating user. The participation acceptance unit 18 manages the information on the chat participating users or game participating users in the server memory 26.

The user instruction reception unit 20 receives chat messages from the terminals of the chat participating users whose participation in the chat is accepted via the server communication unit 12. The user instruction reception unit 20 receives instructions for a program of the game from the terminals of the game participating users.

Herein, an "instruction for a progress of the game" may include selection of an item given to the game participating user, use of the item, or permission/non-permission to exercise an authority given according to a progress of the game. An "authority given according to a progress of the game" is activity options for a progress of the game given according to a progress of the game, such as "call", "raise" and "fold" in poker or "riichi", "pong", "chow" and "kong" in mah-jongg.

The user instruction reception unit 20 receives chat messages from the terminals of the game participants or game spectators also during the game. The user instruction reception unit 20 receives chat messages containing characters (such as Hiragana, Katakana, alphameric characters and symbols) from the terminals of the game participating users, analyzes the chat messages, and converts them into instructions for a progress of the game.

When a game participant inputs "8 of spades" on the chat of the user terminal, the analysis of the chat message includes a confirmation as to whether the "card of 8 of spades" is in the user's own cards.

When the card is present, the user instruction reception unit 20 causes the screen display control unit 22 to generate an image that the "card of 8 of spades" is placed on the game table, and thereby converts the user-input "8 of spades" into an activity of "placing 8 of spades among the cards on the table". Alternatively, a message for confirming the user as to whether to place "8 of spades" may be notified by the server communication unit 12 before placing the card. On the other hand, when the card is not present, a message for notifying the absence of the card to the user may be notified by the server communication unit 12. Further, "8 of spades" displayed on the screen by the screen display control unit 22 described later may be displayed with strike-through overlapped thereon in order for other chat participating users to recognize that the "card of 8 of spades" is not present.

The above analysis and conversion may be of "8 spades" or "spades eight", or a character for requesting such an analysis may be added before or after the chat message such as "@8 of spades" or "8 of spades@." The above analysis and conversion may be performed under a condition that a predetermined position on the screen of the user terminal is tapped after "8 of spades" is input. A syntax analysis for characters and the like required for the above analysis processing may be performed in combination with a well-known technique.

The screen display control unit 22 acquires a chat message received by the user instruction reception unit 20 via the server memory 26, and displays it on the screens of the terminals of the chat participating users. The screen display control unit 22 displays an image corresponding to the instruction received by the user instruction reception unit 20 on the chat screen. An "image corresponding to the received instruction" may be an image of a picture of the card put out of the cards in the card game, or an image of a mah-jongg tile as a discarded tile in the mah-jongg.

The screen display control unit 22 displays chat messages from the terminals of the game participants or game spectators and a progress of the game on the chat screens of the terminals of the game participants and the game spectators. When an activity in a progress of a game, such as "call", "raise" or "fold" in poker or "riichi", "pong", chow" or "kong" in mah-jongg is performed, the screen display control unit 22 may display each activity's name as "stamp picture" or display it together with voice or vibration, a change in tone of the chat screen, or ON/OFF of the flash function provided in the user terminal.

The screen display control unit 22 displays a button image for exercising an authority given according to a progress of the game on the chat screen of a game participating user given the authority and the game participating user designates the button image so that the user instruction reception unit 20 may receives an instruction for a progress of the game. The screen display control unit 22 may display a promotion of the progress on the chat screen or make a push notification in order to promote the game participating users to progress the game.

The game control unit 24 receives a request of starting an in-chat game capable of being played on the chat from the user terminal of a chat participating user and asks other chat participating users participating in the chat for their wish to participate in the game requested to start.

The game management unit 14 manages a progress of the in-chat game via the server communication unit 12 after the game is started. The game management unit 14 accesses the user information or card management data stored in the server memory 26, and performs a predetermined processing along with a progress of the in-chat game.

Figure 3:
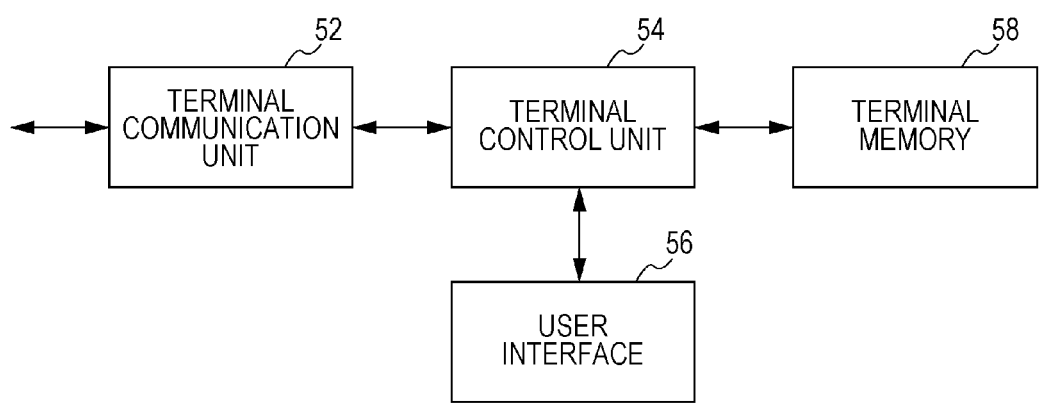
FIG. 3 is a diagram illustrating an exemplary structure of a mobile terminal or PC terminal of FIG. 1.

Then, a structure of the user terminal will be described with reference to FIG. 3. FIG. 3 is a diagram illustrating an exemplary structure of the mobile terminal 50 or PC terminal 70 of FIG. 1. Herein, a structure of the mobile terminal 50 will be described for convenient description, but the PC terminal 70 may also have a similar structure.

The mobile terminal 50 includes a terminal communication unit 52, a terminal control unit 54, a user interface 56 and a terminal memory 58. The terminal communication unit 52 receives an app downloaded from the server device 10 or various items of information transmitted from the server device 10. The terminal communication unit transmits a user instruction input via the user interface 56 to the server device 10.

The terminal control unit 54 receives a user instruction via the user interface 56, and performs app install control, chat processing or in-chat game control, or social game API control while accessing the terminal memory 58.

The user interface 56 displays a chat screen in which chat messages exchanged among the chat participating users, a notification message to the users, a progress of the in-chat game are indicated. The user interface 56 includes a display device with a sensor function for sensing a user's tap operation, an input interface for receiving user's input such as keyboard or touch panel, or an image shooting means such as camera.

When an app game does not use a web browser, the terminal memory 58 is used to store its app program. However, it may be used for temporarily storing a cache memory or image data also in a browser game.

Collective operations of the present invention will be described by use of first to fifth screen display examples of the user terminal illustrated in FIG. 4 to FIG. 8. For the same notations in the screen display examples, only the first notations are explained, and the previously-appeared notations are denoted with the same numerals and their explanation will be omitted.

Figure 4:
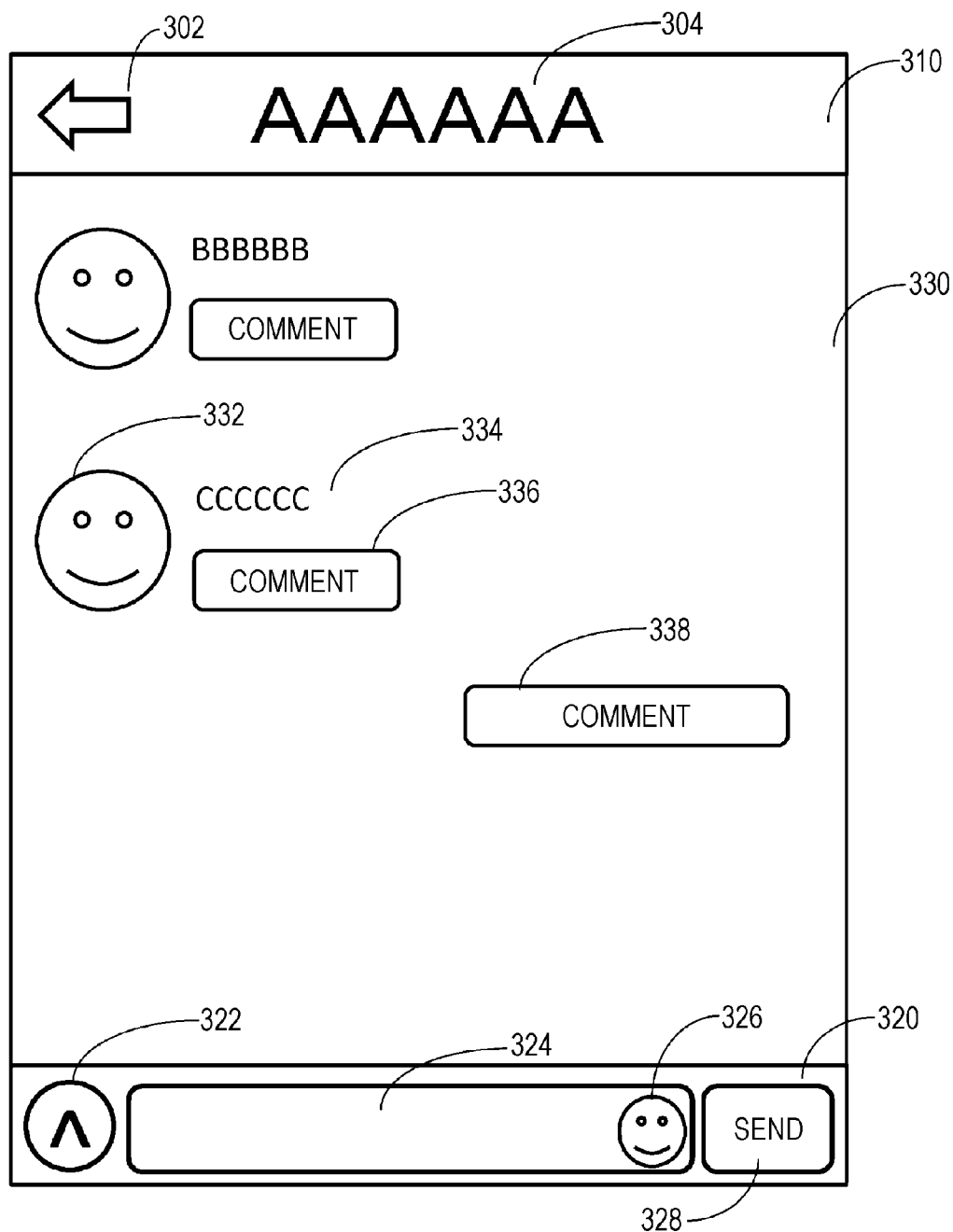
FIG. 4 is a diagram illustrating a first screen display example of the user terminal of FIG. 1.

FIG. 4 is a diagram illustrating a first screen display example 201 of the user terminal of FIG. 1. The first screen display example 210 is an exemplary screen display when the user "AAAAAA" have a chat with the user "BBBBBB" and the user "CCCCCC", and is provided to each user via the user interface 56 of each user terminal. The first screen display example 210 includes a user name display column 310, a chat control column 320, and a chat screen 330.

The user name display column 310 includes a return button 302 and a user name 304. When the user taps the region displaying the return button 302 therein, the processing of returning to the previous screen is performed.

The chat control column 320 is used for a chat. The chat control column 320 includes a screen pop button 322, a chat message display column 324, an emoji selection button 326 and a send button 328.

The screen pop button 322 is a button on which the user taps for popping up or popping down a screen. The chat message display column 324 is a column into which the user writes a message to be sent to chat members by use of the user interface 55 or an instruction for a progress of the game.

The emoji selection button 326 is a button for displaying a list of emoji to be displayed on the chat screen. The send button 328 is a button on which the user taps for analyzing a message in the chat message display column 324 and displaying a chat message or an image corresponding to an instruction received during the game on the chat screen 330.

The chat screen 330 includes an avatar image 332, other user name 334, and message display columns 336 and 338. The first screen display example 210 displays therein the avatar images, the user names and the messages of the user "BBBBBB" and the user "CCCCCC" on the left side of the chat screen 330 and displays therein a message of the user "AAAAAA" on the right side.

Figure 5:
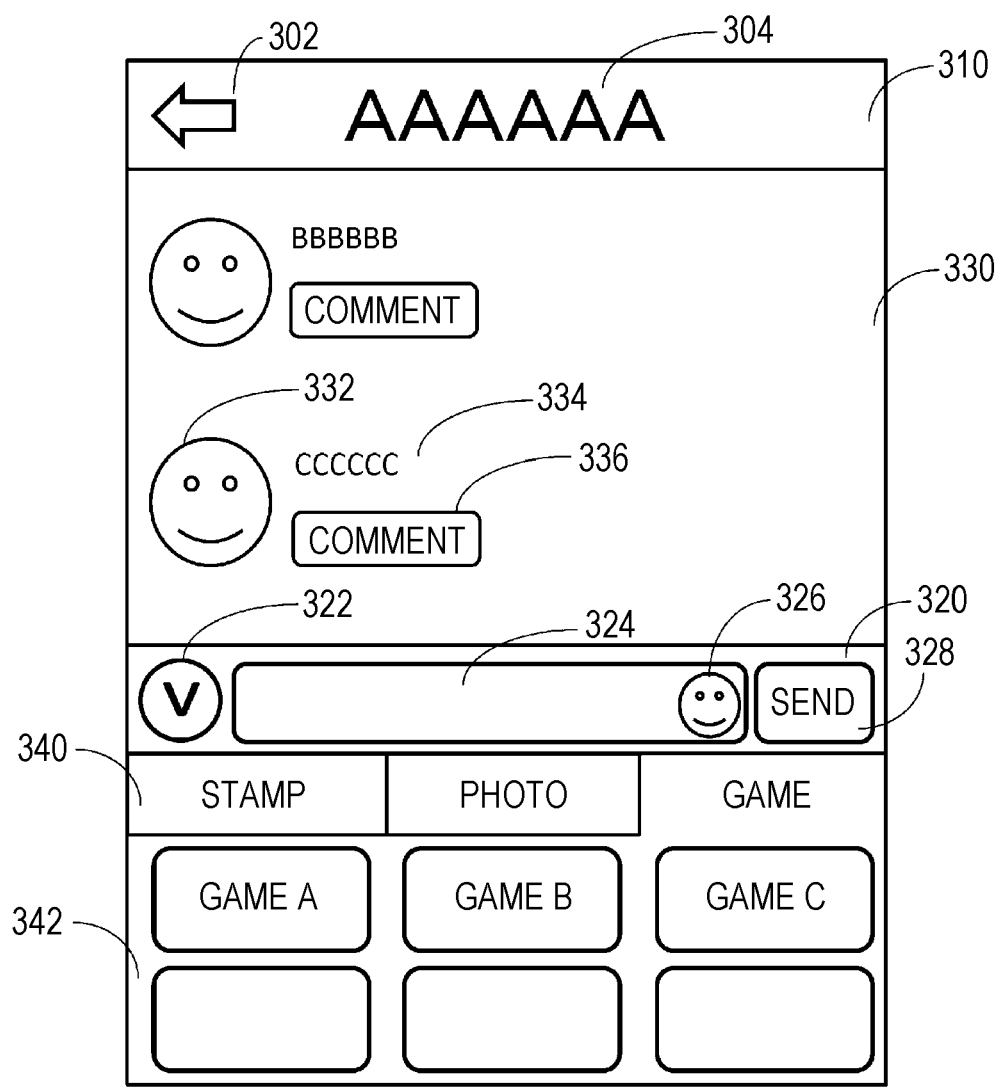
FIG. 5 is a diagram illustrating a second screen display example of the user terminal of FIG. 1.

Herein, the first screen display example 210 will be described with reference to FIG. 5 assuming that the user "AAAAAA" taps on the screen pop button 322. FIG. 5 is a diagram illustrating a second screen display example 220 of the user terminal of FIG. 1.

The second screen display example 220 includes a function display column 340 and a game name display column 342 in addition to the items displayed in the first screen display example 210. The function display column 340 displays therein the names of functions usable in the chat system 100, and displays therein "stamp", "photo" and "game" herein. The game name display column 342 displays therein a name of game selectable as in-chat game. An image indicating the game may be displayed together with the game name in an overlapped manner.

Figure 6:
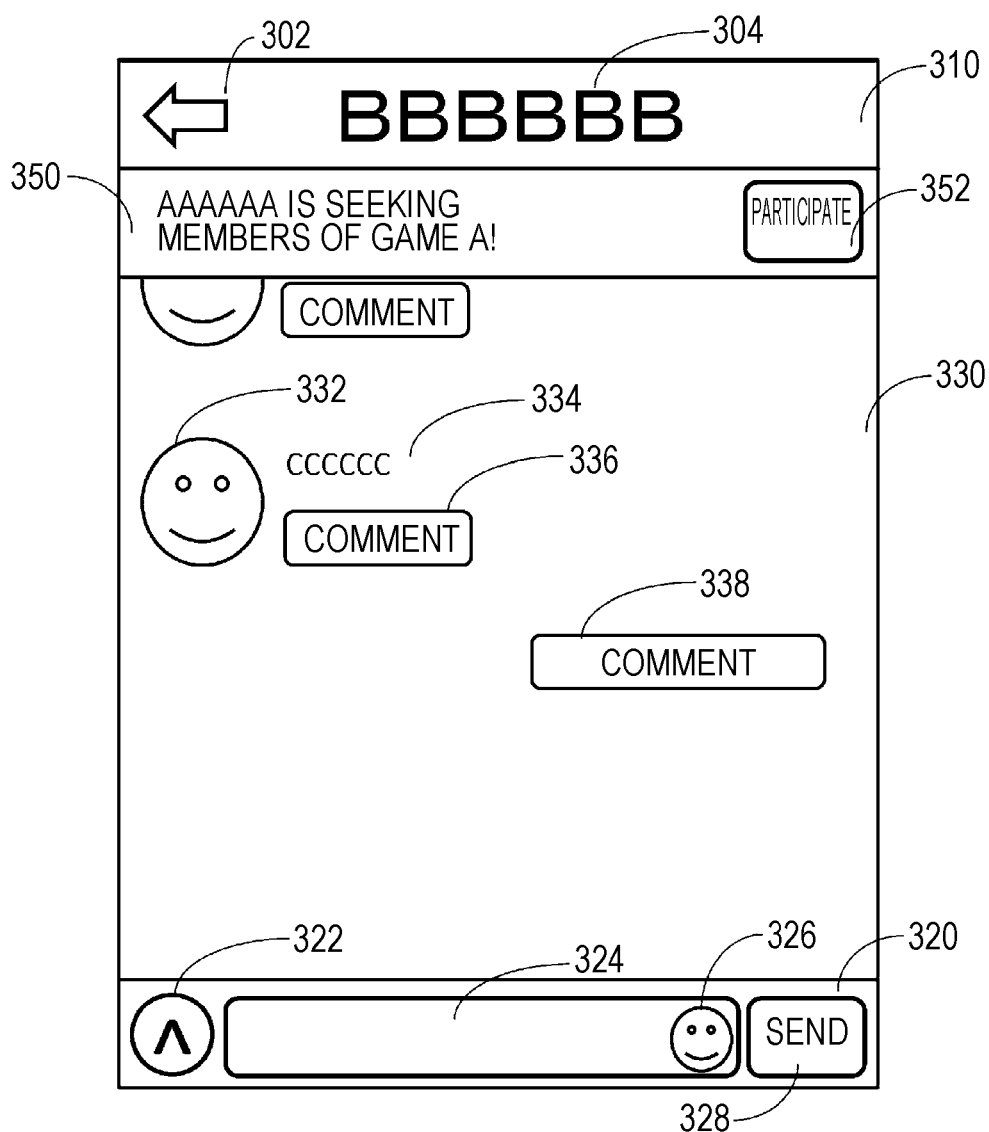
FIG. 6 is a diagram illustrating a third screen display example of the user terminal of FIG. 1.

There will be described below, with reference to FIG. 6, a chat screen of other chat member when the user "AAAAAA" taps "game A" in the second screen display example 220. FIG. 6 is a diagram illustrating a third screen display example 230 of the user terminal of FIG. 1. The third screen display example 230 includes a notification column 350 and a participation button 352 in addition to the items displayed in the first screen display example 210. The third screen display example 230 is displayed on the user interface 56 of the user terminal of the user "BBBBBB" as displayed in the user name 304.

The notification column 350 displays a message that the user "AAAAAA" asks for participants in "game A" therein. Herein, when the user "BBBBBB" taps on the participation button 352, he/she can participate in "game A."

Figure 7:
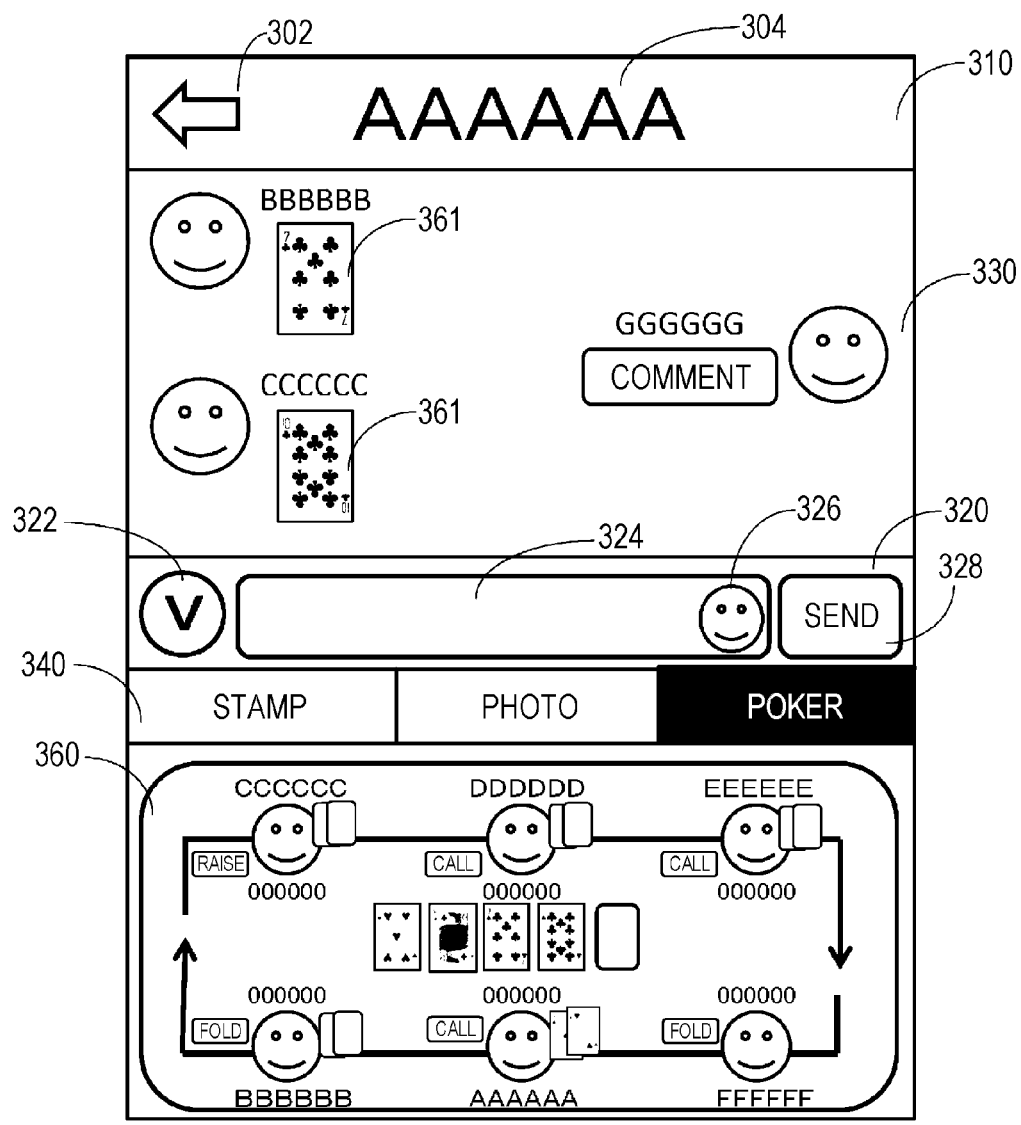
FIG. 7 is a diagram illustrating a fourth screen display example of the user terminal of FIG. 1.

An example in which "poker" is selected as in-chat game will be described below with reference to FIG. 7 and FIG. 8. FIG. 7 is a diagram illustrating a fourth screen display example 240 of the user terminal of FIG. 1. The fourth screen display example 240 includes a game progress display column 360 in addition to the items displayed in the first screen display example 210.

The game progress display column 360 displays cards previously placed on the game table and information on the game participants in "porker" therein. The fourth screen display example 240 assumes that the user "AAAAAA", the user "BBBBBB", the user "CCCCCC", the user "DDDDDD", the user "EEEEEE" and the use "FFFFFF" are game participants and the user "GGGGGG" is a game spectator. A user name, a chat image, a score, the number of holding cards as well as activity name (such as "call", "raise" or "fold") selected by a game participant are displayed per game participant.

The fourth screen display example 240 is a screen displayed on the user interface 56 of the user terminal of the user "AAAAAA" as indicated in the user name 304. Thus, the cards viewable in the game progress display column 360 are only his/her own cards.

All the cards of the game participants may be viewed in the game progress display column 360 on the user interface 56 of the user terminal of the game spectator who does not participate in the in-chat game. Any game participant may select a game spectator for which the cards are permitted to display. The selection is accepted by the user interface 56 of the user terminal of any game participant and is accepted by the game control unit 24 in the server device 10, and the screen display control unit 22 may control the chat screen display of the user terminal of the game spectator for which the cards are to be displayed.

The chat screen 330 displays therein card images 361 placed on the game table by the user "BBBBBB" and the user "CCCCCC" as the game participants. A comment by the user "GGGGGG" as a game spectator is displayed together. The card images 361 placed on the game table on the chat screen 330 are displayed in this way so that realistic sensation is visually enhanced and an interest in the game is enhanced. Additionally, the chat image is displayed on the user interface 56 of the user terminal of the game spectator, not only the game participants, and chat messages from the game spectator are distributed on the chat in real-time, thereby further enhancing an interest in the game.

Figure 8:
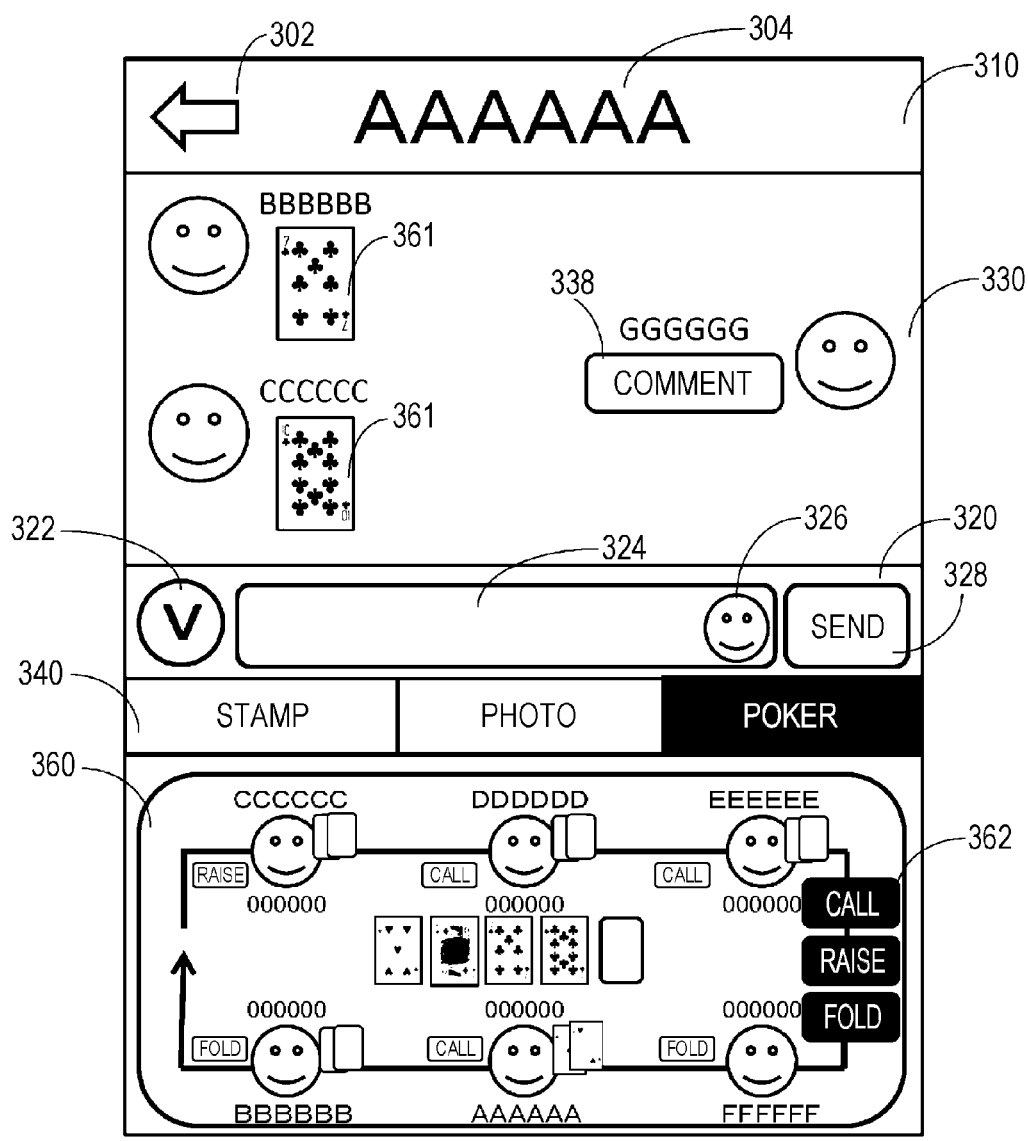
FIG. 8 is a diagram illustrating a fifth screen display example of the user terminal of FIG. 1.

FIG. 8 is a diagram illustrating a fifth screen display example 250 of the user terminal of FIG. 1. An authority selection button 362 is contained in the game progress display column 360 in the fifth screen display example 250. The names of "authorities given according to a progress of the game" selectable by the game participant and the button images are displayed together in the authority selection button 362. Herein, the button images of "call", "raise" and "fold" for "poker" are displayed in this order. When the user taps a position where any button image is displayed, he/she can exercise the authority of the user-tapped button.

Figure 9:
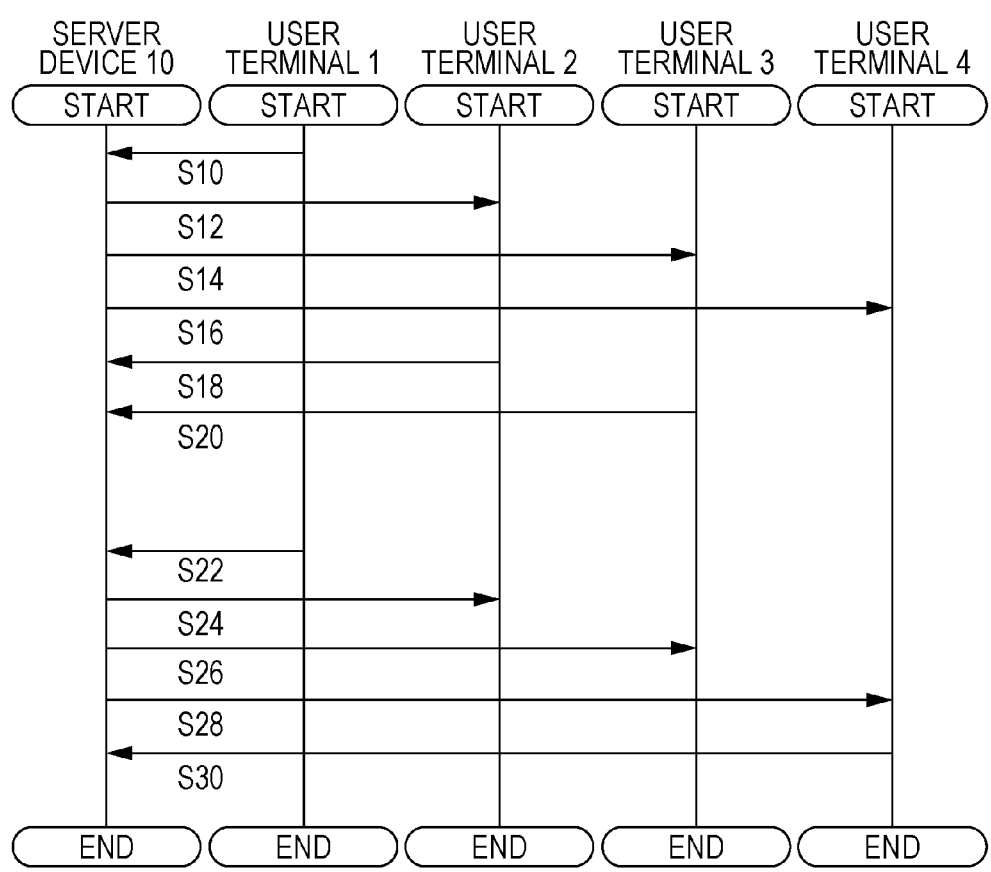
FIG. 9 is a sequence diagram illustrating an exemplary processing procedure of the chat system of FIG. 1.

The exemplary operations will be described below. FIG. 9 is a sequence diagram illustrating an exemplary processing procedure of the chat system 100 of FIG. 1. The sequence diagram assumes that the user terminals 1 to 4 have a chat in the same chat room.

At first, when the user terminal 1 selects a specific in-chat game, the fact is notified to the server device 10 (S10). The server device 10 asks the user terminals 2 to 4 entering the same chat room as the user terminal 1 for their wish to participate in the game in response to the notified request to participate in the in-chat game (S12 to S16).

In response to the participation request, when the user terminal 2 and the user terminal 3 tap the participation button displayed on the chat screen, respectively, their wish to participate is transmitted to the server device 10 (S18, S20). Herein, the user terminal 4 is assumed not to wish to participate.

Thus, the server device 10 starts the game with the user terminals 1 to 3 as game participants and the user terminal 4 as a game spectator. Herein, the user terminal 1 transmits an "instruction for a progress of the game" such as selection of card to be placed on the game table at his/her turn on the game (S22). For example, it is assumed that "ace of diamonds" is selected in the card game.

The server device 10 displays the fact that the "ace of diamonds" is selected by the user terminal 1 on the chat screens of the user terminal 2 and the user terminal 3 as game participants and the user terminal 4 as a game spectator (S24 to S28). When the user terminal 4 creates a comment for the placed card or the like and transmits it as a chat message to the server device 10 (S30), the chat message of the user terminal 4 is displayed on the chat screens of the user terminals 1 to 4. In the following, such a processing is repeated so that the game progresses while the chat is being performed on the chat system 100.

Figure 10:
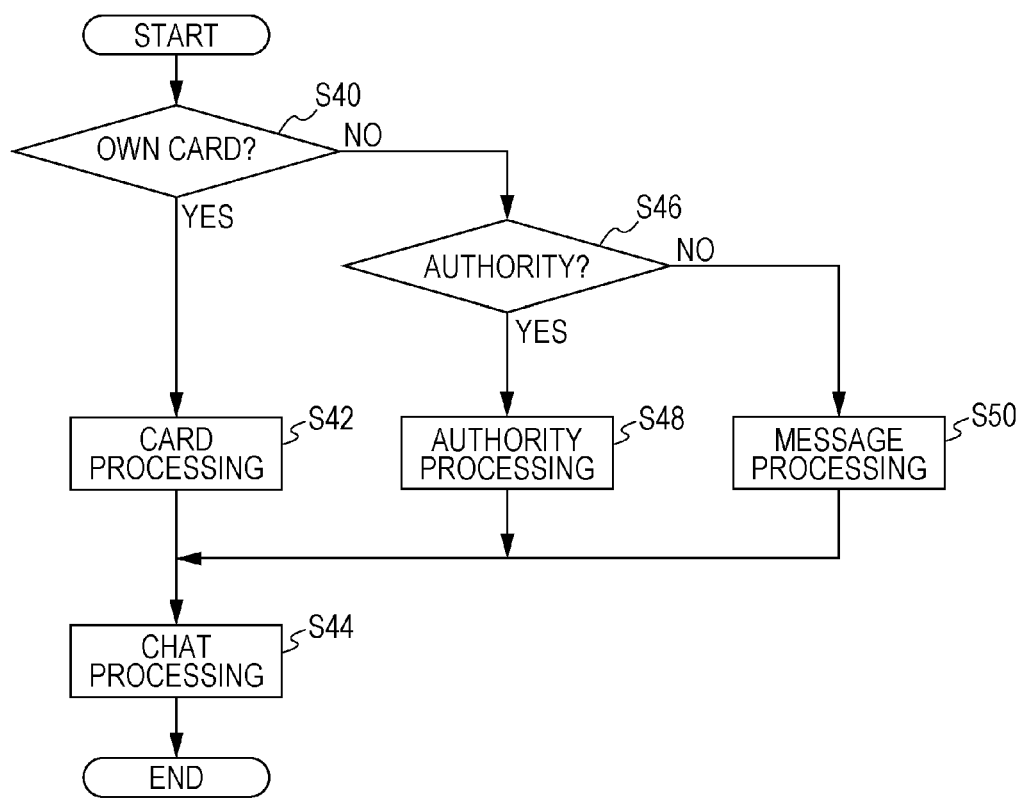
FIG. 10 is a flowchart illustrating an exemplary processing procedure of a user instruction reception unit of FIG. 2.

Then, an exemplary operation of a processing of receiving an "instruction for a progress of the game" from a user in the in-chat game will be described below. FIG. 10 is a flowchart illustrating an exemplary processing procedure of the user instruction reception unit 20 of FIG. 2. The flowchart may be performed when any game participant performs a processing of inputting characters or the like in the chat message display column via the user interface 56 during the in-chat game.

At first, the user instruction reception unit 20 analyzes the input characters or the like (S40). As a result of the analysis, when it is determined that the characters or the like correspond to a card owned by the user in the in-chat game (Yes in S40), the user instruction reception unit 20 performs a processing of selecting the card (S42), and prepares an image of the card to be displayed on the chat screen.

On the other hand (No in S40), when it is determined that the characters or the like indicate an "authority given according to a progress of the game" (Yes in S46), the user instruction reception unit 20 performs an authority processing corresponding to the authority (S48), and prepares an image corresponding to the activity to be displayed on the chat screen. On the other hand, when the characters or the like do not correspond to S40 or S46 (No in S46), a processing for the chat message is performed (S50).

Then, the user instruction reception unit 20 performs a processing of displaying the image prepared by any of the card processing (S42), the authority processing (S48) and the message processing (S50) on the chat screens of the game participants and the game spectator (S44). Herein, in the card processing (S42) or the authority processing (S48), a specific image such as stamp for indicating a card or authority is prepared and thus can be displayed in a different form from the message processed in the message processing (S50). Thus, the participating users can recognizes, by the input message, that the user does not own (No in S40) or does not have an authority (No in S40). On the other hand, when the message indicates that the user does not own (No in S40) or does not have an authority (No in S46), the processing may prepare for indicating that the user does not own or does not have an authority on the chat in the message processing (S50). In the chat processing (S44) in this case, "not own" or "no authority" may be displayed by the message, a strike-through may be added to the message, or a color or background of the message may be changed therefor.

The present invention has been described above by way of the embodiment. The present invention is not limited to the embodiment and the contents of the embodiment, and may be variously changed or performed within the scope of the present invention. Those skilled in the art can understand that the embodiment is exemplary, many variants can be possible for combinations of the components or processing processes, and the variants are also encompassed within the scope of the present invention.

What is claimed is:

1. A non-transitory computer-readable storage medium storing a game program, the program causing a computer to perform:
    a participation acceptance step of accepting participation in a predetermined chat in a user interface from a user terminal via a communication line;
    a user instruction reception step of receiving a chat message and a display switching instruction from the terminal of one or more chat participating users whose participation in the chat is accepted;
    a screen display control step of displaying the received chat message on the chat screen in the user interface of the terminal of the one of more chat participating users;
    a game control step of receiving selection of one in-chat game among a plurality of in-chat games playable on the chat and a request of starting the in-chat game from the terminal of the one or more chat participating users, requesting other ones of the one or more chat participating users participating in the chat for their wish to participate in the game requested to start, and starting the in-chat game within the user interface of the chat wherein the chat between one or more game participating users and the one or more chat participating users is maintained after starting the in-chat game, wherein the user interface is configured to provide a display of a progress of the in-chat game to the chat screen of the one or more chat participating users; and
    a game management step of managing the progress of the in-chat game after the game is started,
    wherein the participation acceptance step accepts participation of the one or more chat participating users responding to the request the participation in the game control step as the one or more game participating users,
    the user instruction reception step receives an instruction for the progress of the in-chat game from the terminal of the one or more game participating users,
    the screen display control step displays a game progress display region indicating the progress of the in-chat game on part of the chat screen, and when receiving the display switching instruction in the user instruction reception step, switches display/hide of the game progress display region, and
    the screen display control step displays an image corresponding to an instruction for the progress of the in-chat game received from the one or more game participating users in the user instruction reception step on the chat screen of the terminal of the one or more chat participating users.

2. The non-transitory computer-readable storage medium storing game program according to claim 1,
    wherein an instruction for a progress of the in-chat game received in the user instruction reception step includes selection of an item given to the one or more game participating users, use of an item, or permission/non-permission to exercise an authority given according to the progress of the in-chat game.

3. The non-transitory computer-readable storage medium storing game program according to claim 1,
    wherein the screen display control step displays a button image for exercising an authority given according to the progress of the game on the chat screen of the one or more game participating users given the authority and the one or more game participating users designates the button image so that an instruction for progress of the in-chat game is received in the user instruction reception step.

4. The non-transitory computer-readable storage medium storing game program according to claim 1,
wherein the user instruction reception step receives a chat message from the terminal of the one or more game participating users, and analyzes and converts the chat message into an instruction for the progress of the in-chat game.

5. The non-transitory computer-readable storage medium storing game program according to claim 4,
wherein when a chat message from the terminal of the one or more game participating users contains information for requesting an analysis, the user instruction reception step analyzes the chat message.

6. The non-transitory computer-readable storage medium storing game program according to claim 1,
wherein the screen display control step displays a promotion of the progress on the chat screen or makes a push notification in order to promote the one or more game participating users to progress the in-chat game.

7. A method in a server device which makes communication with a user terminal via a communication line, the method comprising:
a participation acceptance step in which the server device accepts participation in a predetermined chat in a user interface from the user terminal of a user;
a user instruction reception step in which the server device receives a chat message and a display switching instruction from the user terminal of one or more chat participating users whose participation in the chat is accepted;
a step in which the server device stores contents received in the participation acceptance step and the user instruction reception step in a memory;
a screen display control step in which the server device displays a chat message stored in the memory on the chat screens in the user interface of the user terminals of the one or more chat participating users;
a game control step in which the server device receives selection of one in-chat game among a plurality of in-chat games playable on the chat and a request to start the in-chat game from the user terminal of the one or more chat participating users and stores them in the memory, and requests other ones of the one or more chat participating users participating in the chat for their wish to participate in the game requested to start, thereby starting the in-chat game within the user interface of the chat, wherein the chat between one or more game participating users and the one or more chat participating users is maintained after starting the in-chat game, wherein the user interface is configured to provide a display of a progress of the in-chat game to the chat screen of the one or more chat participating users; and
a game management step in which the server device manages the progress of the in-chat game after the game is started,
wherein the participation acceptance step accepts participation of the one or more chat participating users responding to the request about the participation in the game control step as the one or more game participating users, and stores the same in the memory,
the user instruction reception step receives an instruction for the progress of the in-chat game from the user terminal of the one or more game participating users and stores it in the memory,
the screen display control step displays an image corresponding to an instruction for the progress of the in-chat game received from a game participating user in the user instruction reception step on the chat screen of the terminal of the one or more chat participating users.

8. A server device comprising:
a participation acceptance unit configured to accept participation in a predetermined chat in a user interface from a user terminal via a communication line;
a user instruction reception unit configured to receive a chat message and a display switching instruction from the terminal of one or more chat participating users whose participation in the chat is received;
a screen display control unit configured to display the received chat message on the chat screen in the user interface of the terminal of the one or more chat participating users;
a game control unit configured to receive selection of one in-chat game among a plurality of in-chat games playable on the chat and a request to start the in-chat game from the terminal of the one or more chat participating users, and requesting other ones of the one or more chat participating users participating in the chat for their wish to participate in the game requested to start, thereby starting the in-chat game within the user interface of the chat, wherein the chat between one or more game participating users and the one or more chat participating users is maintained after starting the in-chat game, wherein the user interface is configured to provide a display of a progress of the in-chat game to the chat screen of the one or more chat participating users; and
a game management unit configured to manage the progress of the in-chat game after the game is started,
wherein the participation acceptance unit accepts participation of the one or more chat participating users responding to the inquiry about the participation in the game control unit as the one or more game participating users,
the user instruction reception unit receives an instruction for the progress of the in-chat game from the terminal of the one or more game participating users,
the screen display control unit displays a game progress display region indicating the progress of the in-chat game on part of the chat screen, and when receiving the display switching instruction in the user instruction reception unit, switches display/hide of the game progress display region, and
the screen display control unit displays an image corresponding to an instruction for the progress of the in-chat game received from the one or more game participating users in the user instruction reception unit on the chat screen of the terminal of the one or more chat participating users.

* * * * *